United States Patent
Ichikawa

(10) Patent No.: US 11,550,522 B2
(45) Date of Patent: Jan. 10, 2023

(54) PRINTER TO DISPLAY AT LEAST ONE PREVIEW IMAGE AND PERFORM PRINTING, BASED ON IMAGE DATA

(71) Applicant: BROTHER KOGYO KABUSHIKI KAISHA, Nagoya (JP)

(72) Inventor: Shuya Ichikawa, Gamagori (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/350,238

(22) Filed: Jun. 17, 2021

(65) Prior Publication Data
US 2022/0011994 A1    Jan. 13, 2022

(30) Foreign Application Priority Data

Jul. 8, 2020  (JP) .............................. JP2020-117494
Jul. 8, 2020  (JP) .............................. JP2020-117514

(51) Int. Cl.
    *G06F 3/12*    (2006.01)
(52) U.S. Cl.
    CPC .......... *G06F 3/1256* (2013.01); *G06F 3/1207* (2013.01); *G06F 3/1239* (2013.01); *G06F 3/12* (2013.01)

(58) Field of Classification Search
    CPC .... G06F 3/1256; G06F 3/1207; G06F 3/1239; G06F 3/1208; G06F 3/1219; G06F 2206/1514; G06F 3/12
    USPC ......................................................... 358/1.14
    See application file for complete search history.

(56) References Cited

U.S. PATENT DOCUMENTS

| 2004/0190057 A1* | 9/2004 | Takahashi ............. G06F 3/1205 358/1.15 |
| 2010/0053680 A1* | 3/2010 | Sato ........................ G03G 15/50 358/1.15 |
| 2010/0149590 A1 | 6/2010 | Nishiyama et al. |

FOREIGN PATENT DOCUMENTS

JP    2010-147569 A    7/2010

* cited by examiner

*Primary Examiner* — Darryl V Dottin
(74) *Attorney, Agent, or Firm* — Scully, Scott, Murphy & Presser, PC

(57) ABSTRACT

A printer includes a display, and a controller configured to obtain image data for a plurality of pages displayable on the display, display, on the display, an image based on image data for at least one page among the obtained image data for the plurality of pages, and perform printing based on the obtained image data when a display mode for the image displayed on the display fulfills a print start condition.

30 Claims, 9 Drawing Sheets

| Preview Display Condition(s) | | Display Information | Print Allowance Condition | Setting Item to be Reconfigured |
|---|---|---|---|---|
| Parameter Conditions | Color Copy | Setting for Displaying Preview Display Condition(s) is Valid or Invalid | Individual-Image Print Allowance Condition | Setting Item Related to Print Color |
| | Number of Copies to be Printed | | | Setting Item Related to Number of Copies to be Printed |
| Number-of-Sheets Condition (Number of Sheets to be Printed) | | | All-Image Print Allowance Condition | Setting Item Related to Number of Sheets to be Printed |

FIG. 8

PRINTER TO DISPLAY AT LEAST ONE PREVIEW IMAGE AND PERFORM PRINTING, BASED ON IMAGE DATA

CROSS-REFERENCE TO RELATED APPLICATION

This application claims priority under 35 U.S.C. § 119 from Japanese Patent Applications No. 2020-117494 and No. 2020-117514 that were filed on Jul. 8, 2020. The entire subject matter of the applications is incorporated herein by reference.

BACKGROUND

Technical Field

Aspects of the present disclosure are related to a printer to display one or more images based on image data as preview images and print the one or more images displayed as the preview images.

Related Art

A printer has been known that is configured to display, as a preview image, an image based on image data and thereafter perform printing of the image displayed as the preview image.

SUMMARY

Aspects of the present disclosure are advantageous to provide one or more improved techniques to display one or more images based on image data as preview images and print the one or more images displayed as the preview images, in a preferred manner.

According to aspects of the present disclosure, a printer is provided, which includes a display and a controller configured to obtain image data for a plurality of pages displayable on the display, display, on the display, an image based on image data for at least one page among the obtained image data for the plurality of pages, and perform printing based on the obtained image data, when a display mode for the image displayed on the display fulfills a print start condition.

According to aspects of the present disclosure, further provided is a printer that includes a display, a user interface, and a controller configured to obtain image data, receive, via the user interface, a display condition for displaying on the display at least one image based on the obtained image data, when the received display condition is fulfilled, display on the display the at least one image based on the obtained image data, receive, via the user interface, a print condition for performing printing based on the image data for the at least one image displayed on the display, and perform the printing based on the image data for the at least one image displayed on the display, when the display condition is fulfilled, the at least one image based on the obtained image data is displayed on the display, and the received print condition is fulfilled.

According to aspects of the present disclosure, further provided is a printer that includes a display, a user interface, and a controller configured to obtain image data, receive, via the user interface, one or more display conditions for displaying on the display at least one image based on the obtained image data, when the received one or more display conditions are fulfilled, display on the display the at least one image based on the obtained image data, and when the at least one image based on the obtained image data is displayed on the display, display on the display a notification screen to provide a notification about restriction of a printing process of printing the at least one image displayed on the display.

BRIEF DESCRIPTION OF THE ACCOMPANYING DRAWINGS

FIG. 8 shows settable preview display conditions, display information, settable print allowance conditions, and reconfigurable setting items, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like. Hereinafter, an illustrative embodiment according to aspects of the present disclosure will be described with reference to the accompanying drawings.

Figure 1:
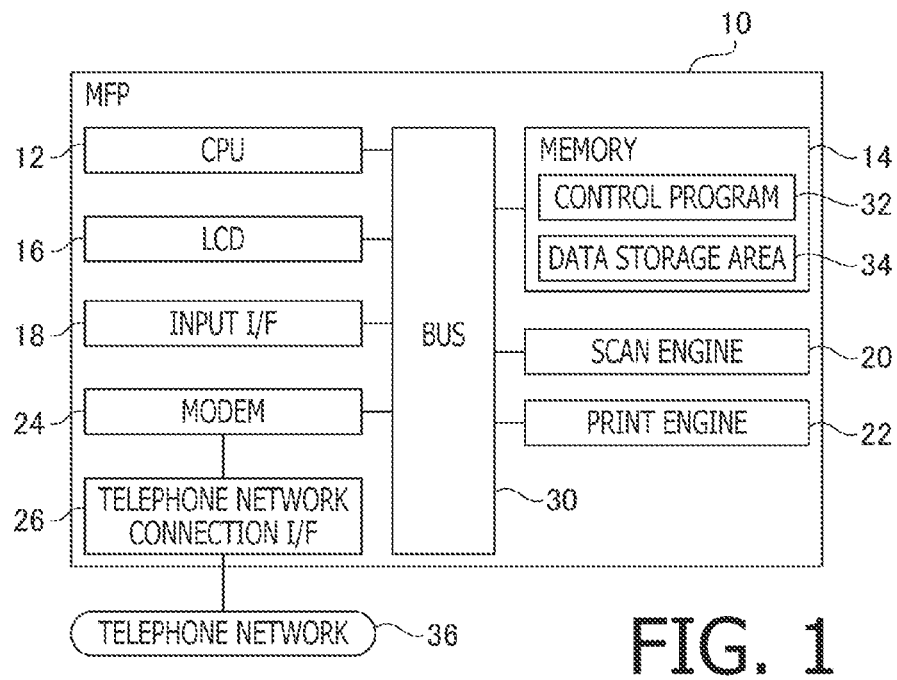
FIG. 1 is a block diagram showing a configuration of an MFP ("MFP" is an abbreviation for "Multi-Function Peripheral"), in an illustrative embodiment according to one or more aspects of the present disclosure.
Figure 2:
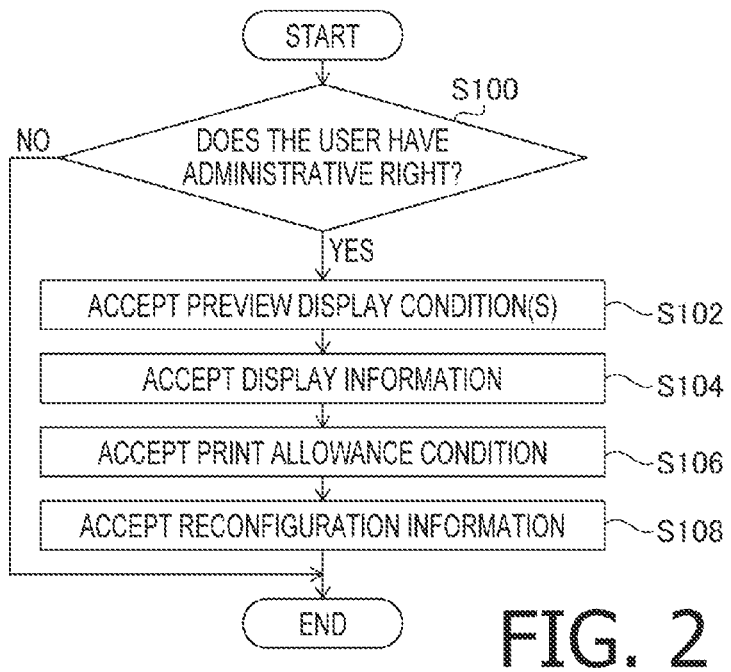
FIG. 2 is a flowchart showing a process to be performed by the MFP (more exactly, a CPU of the MFP) executing a control program, in the illustrative embodiment according to one or more aspects of the present disclosure.
Figure 3:
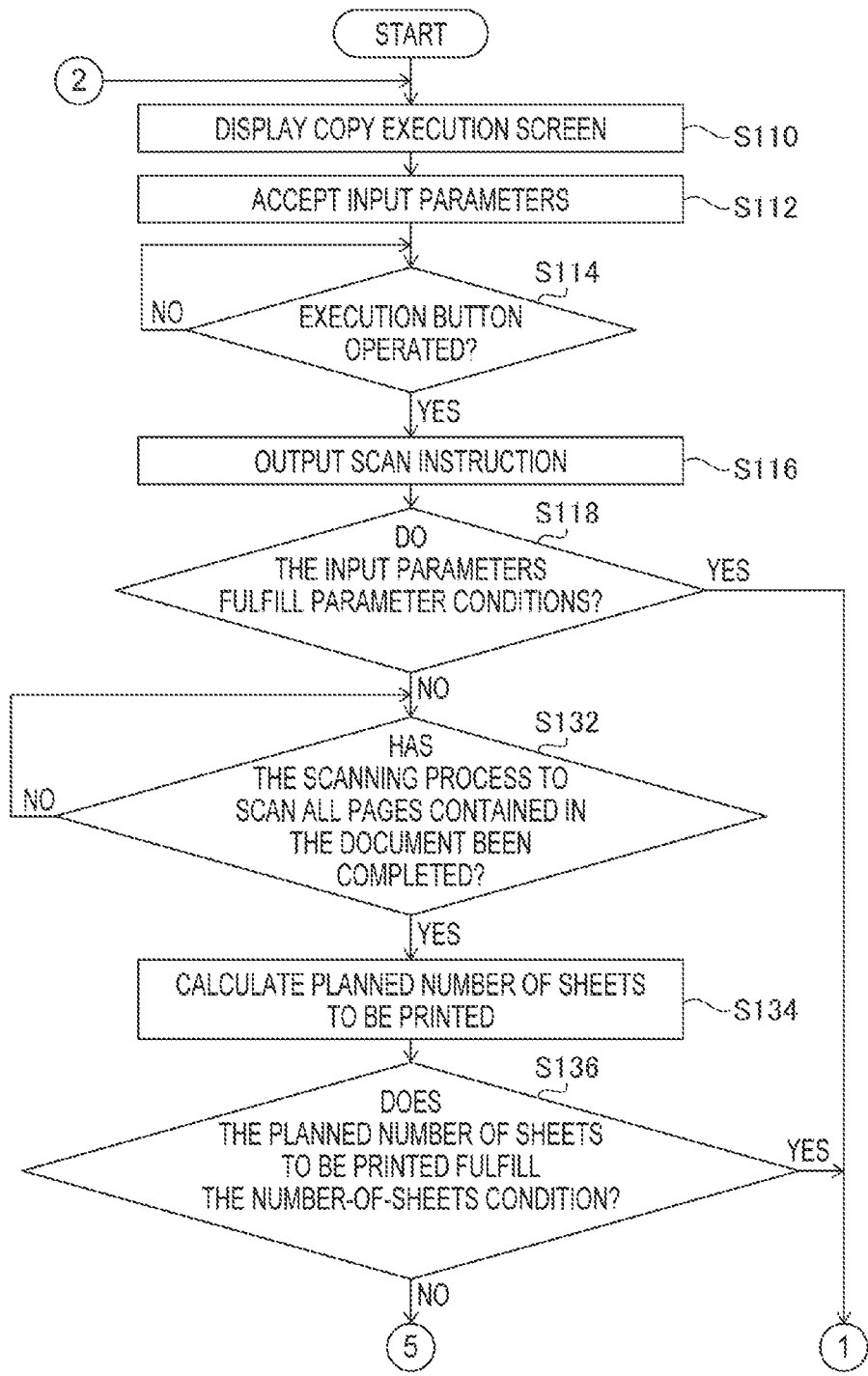
FIGS. 3 and 4 are flowcharts showing a main routine of a copy process to be performed by the CPU executing the control program, in the illustrative embodiment according to one or more aspects of the present disclosure.
Figure 4:
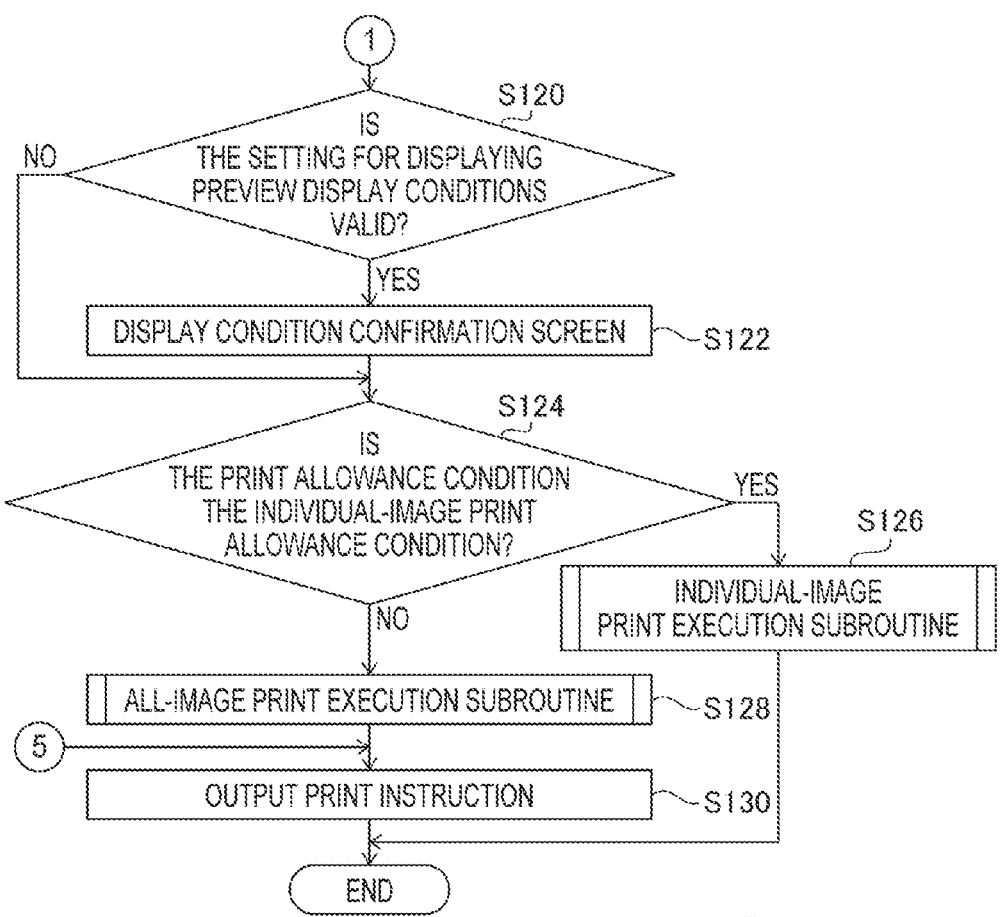
Figure 5:
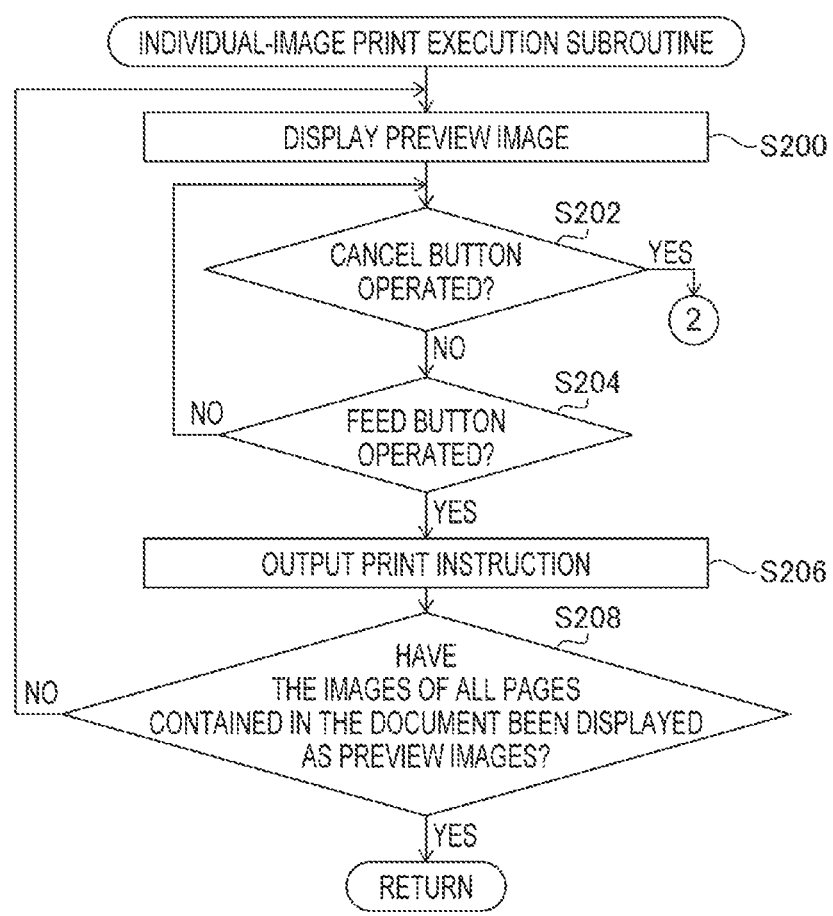
FIG. 5 is a flowchart showing a procedure of an individual-image print execution subroutine to be performed by the CPU executing the control program, in the illustrative embodiment according to one or more aspects of the present disclosure.
Figure 6:
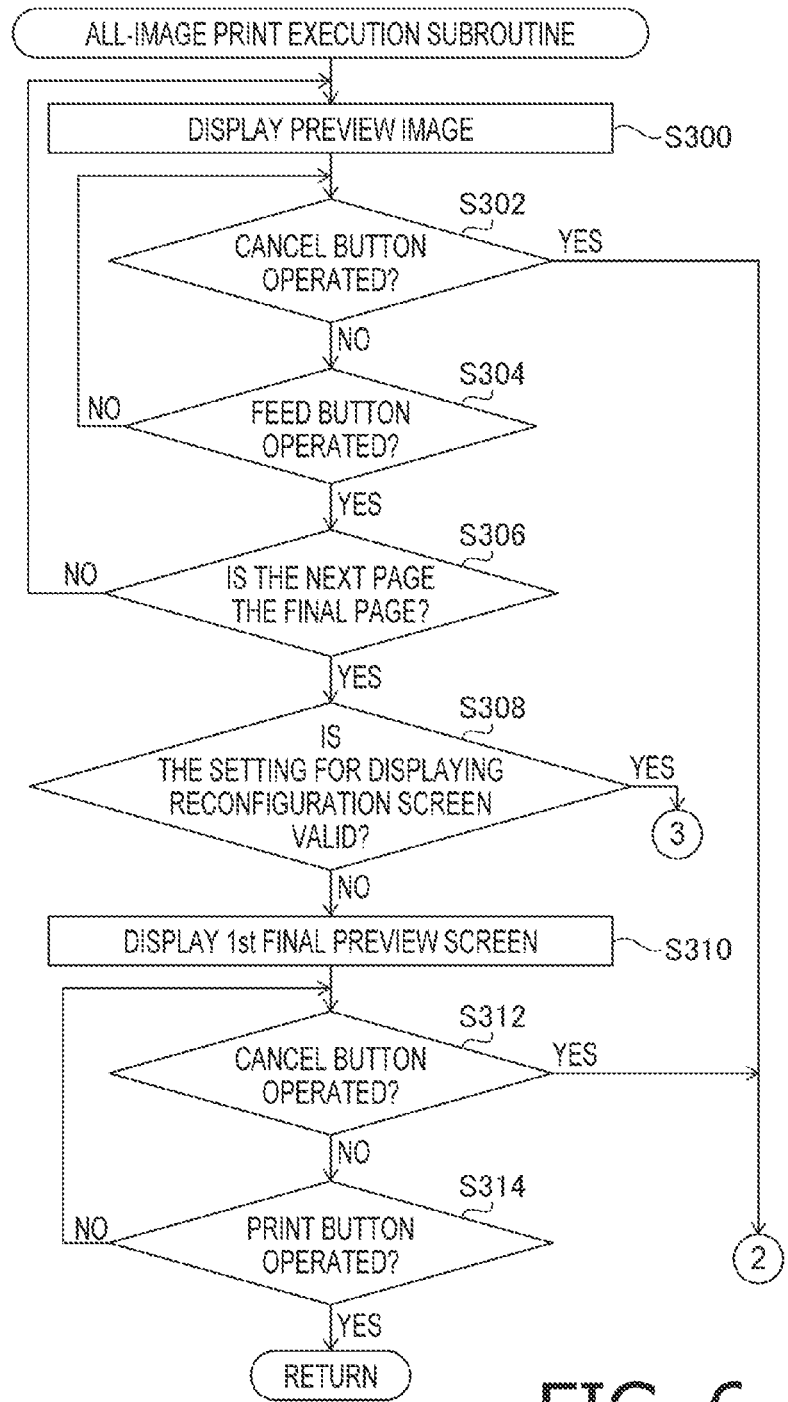
FIGS. 6 and 7 are flowcharts showing a procedure of an all-image print execution subroutine to be performed by the CPU executing the control program, in the illustrative embodiment according to one or more aspects of the present disclosure.
Figure 7:
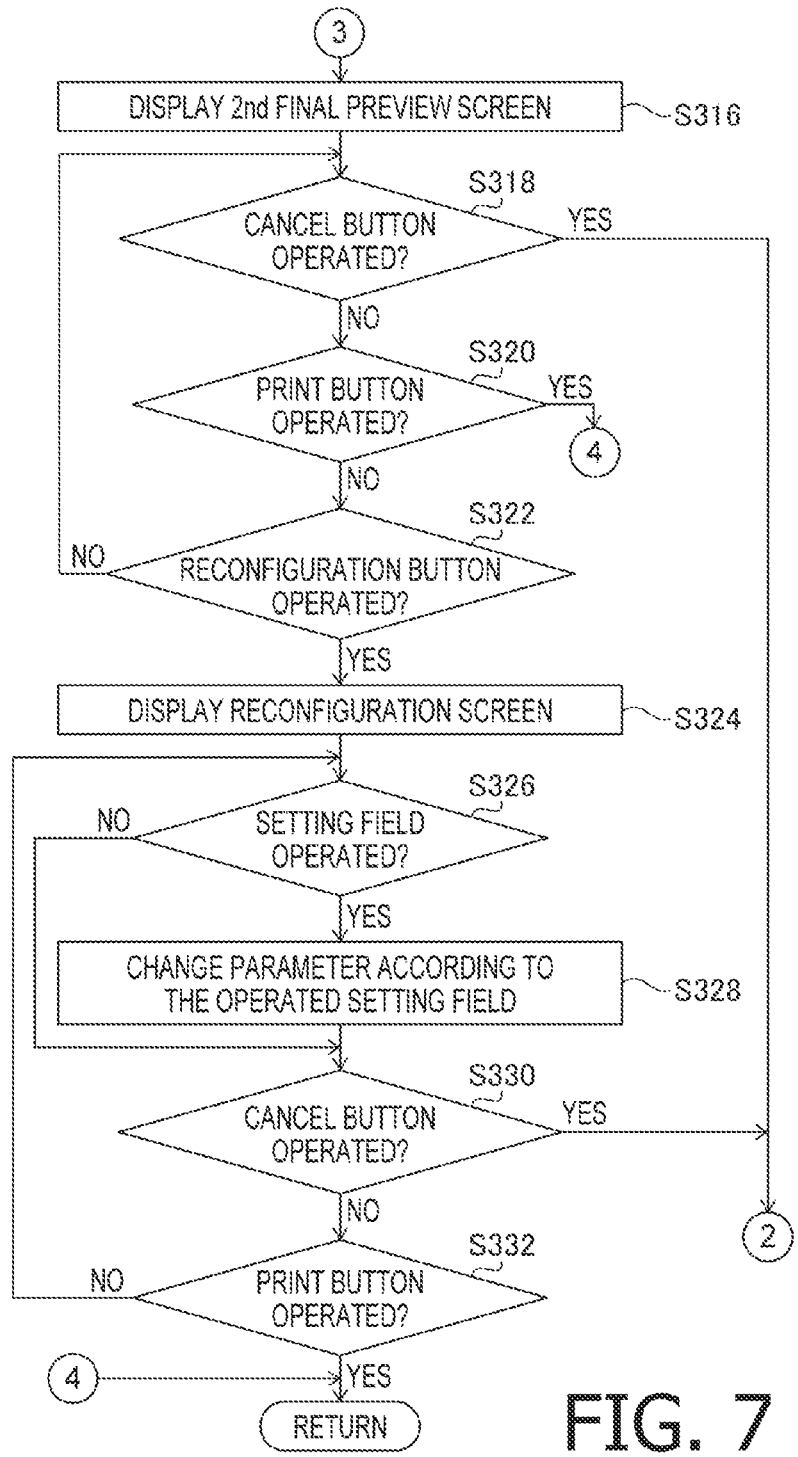

FIG. 1 shows a block diagram of an MFP ("MFP" is an abbreviation for "Multi-Function Peripheral") 10 in the illustrative embodiment. The MFP 10 includes a CPU 12, a memory 14, an LCD 16, an input I/F ("I/F" is an abbreviation for "interface") 18, a scan engine 20, a print engine 22, a modem 24, and a telephone network connection I/F 26. These elements included in the MFP 10 are communicably interconnected via a bus 30.

The CPU 12 performs processes according to a control program 32 stored in the memory 14. The control program 32 is for performing image forming processes such as scanning process and a printing process. Hereafter, the CPU 12 executing the control program 32 may be referred to simply with the name of the program. Specifically, for instance, an expression "the control program 32" may represent "the CPU 12 executing the control program 32." It is noted that the CPU 12 and the memory 14 storing the control program 32 may form a "controller" to control operations by the MFP 10.

The memory 14 has a data storage area 34. The data storage area 34 is for storing various types of information and data such as data necessary for execution of the control program 32. The memory 14 may include at least one of RAMs, ROMs, flash memories, HDDs, portable storage media (e.g., a USB memory) detachably attached to the PC 10, and a buffer of the CPU 12.

Further, the memory 14 may include a non-transitory computer-readable storage medium. Examples of the non-transitory computer-readable storage medium may include, but are not limited to, recording media such as CD-ROMs and DVD-ROMs as well as the aforementioned various storages. The non-transitory computer-readable storage medium is also a tangible medium. On the other hand, an electrical signal carrying a program downloaded, e.g., from a server on the Internet, is a computer-readable signal medium, but is not included in the examples of the non-transitory computer-readable storage medium.

The LCD 16 is configured to display various types of information regarding the MFP 10. It is noted that, instead of the LCD 16, the MFP 10 may include a different type of display such as an organic electroluminescence display. The input I/F 18 may include a touch panel integrated with the display and configured to receive user operations to operable members (e.g., icons and buttons) displayed on the display. Further, the input I/F 18 may include hard keys.

The scan engine 20 is configured to perform image scanning to scan an image on a document. The scan engine 20 includes an image sensor such as a CCD image sensor or a contact image sensor. Thereby, the MFP 10 is enabled to perform a scanning process using the scan engine 20. For instance, the print engine 22 may include an inkjet head. The CPU 12 inputs a drive signal into the print engine 22. Then, when the print engine 22 includes the inkjet head, the CPU 12 causes the print engine 22 to discharge ink from nozzles of the inkjet head in accordance with the input drive signal. Thereby, the MFP 10 is enabled to perform a printing process using the print engine 22.

The modem 24 is configured to modulate document data (i.e., data generated by scanning a document) to be transmitted by a facsimile function into signals transmittable to a telephone network 36 and transmit the modulated signal through the telephone network connection I/F 26. The modem 24 is further configured to receive signals input from the telephone network 36 through the telephone network connection I/F 26 and demodulate the input signals into document data. Thereby, the MFP 10 is enabled to perform a fax process using the modem 24.

In the present disclosure, processes by the CPU 12 according to instructions described in programs are basically shown. Namely, processes such as "judging," "extracting," "selecting," "calculating," "determining," "specifying," "identifying," "obtaining," "accepting," "receiving," "controlling," and "setting" in the following description may represent processes by the CPU 12. The processes by the CPU 12 may include hardware control via an OS ("OS" is an abbreviation for "Operating System"). It is noted that "obtaining" may be used as a concept that does not necessarily require a request. Namely, a process of the CPU 12 receiving data without making a request for the data may be included in a concept of "the CPU 12 obtains the data." Further, "data" in the following description may be expressed in a computer-readable bit sequence. Additionally, a plurality of pieces of data having substantially the same meaning or content but expressed in different formats shall be treated as the same data. The same applies to "information" in the following description. Further, processes such as "instructing," "responding," and "requesting" may be performed by transmitting information representing "an instruction," "a response," and "a request," respectively. Further, the expressions such as "an instruction," "a response," and "a request," may be used to denote information itself that represents "the instruction," "the response," and "the request," respectively. Further, a process of the CPU 12 determining whether or not the information A represents that it is the matter B may be conceptually described as "determining from the information A whether or not it is the matter B." Furthermore, a process of the CPU 12 determining whether the information A represents that it is the matter B or the matter C may be conceptually described as "determining from the information A whether it is the matter B or the matter C."

The MFP 10 is configured to perform a plurality of image forming processes such as a copy process and a scanning process. In the copy process, for instance, the MFP 10 causes the scan engine 20 to scan a document placed on an ADF ("ADF" is an abbreviation for "Automatic Document Feeder"), thereby generating scanned data. Then, the MFP 10 causes the print engine 22 to perform a printing process to print an image based on the scanned data. However, the MFP 10 may receive a setting as to whether to display, as a preview image, the image based on the scanned data in advance of the printing process, from an administrator of the MFP 10 who is authorized to arbitrarily configure the setting. Further, the MFP 10 is configured to receive a condition for allowing the MFP 10 to perform the printing process to print the image displayed as the preview image, from the administrator who is authorized to set the condition. When the condition is fulfilled, the MFP 10 is allowed to perform the printing process. Processes to be performed at that time by the CPU 12 executing the control program 32 will be described in detail below, with reference to FIGS. 2 to 7.

Specifically, first, the administrator of the MFP 10 sets conditions for the MFP 10. The conditions include preview display condition(s) as to whether to display, as a preview image, an image based on scanned data in advance of a printing process, and a print allowance condition for allowing the MFP 10 to perform the printing process to print the image displayed as the preview image. At this time, the MFP 10 receives a user ID input via the input I/F 18. Then, the control program 32 (more exactly, the CPU 12 executing the control program 32) determines whether the input user ID is registered as an administrator ID. When determining that the input user ID is registered as the administrator ID, the control program 32 (more exactly, the CPU 12 executing the control program 32) determines that the user of the MFP 10 has an administrative right (S100: Yes).

Next, the control program 32 accepts the preview display condition(s) input by the administrator of the MFP 10 (S102). As shown in FIG. 8, the preview display condition(s) may include parameter conditions and a number-of-sheets condition. The parameter conditions indicate parameters for setting items for the copy process. Specifically, a parameter for color copy and a parameter for the number of copies to be printed are settable as the parameter conditions. As will be described in detail later, when the color copy is set as a parameter condition, if a parameter indicating print color, among setting items to be set by the user to perform the copy process, is set to color copy, an image based on the scanned data is displayed as a preview image. When the number of copies to be printed is set as a parameter condition, an arbitrary number of copies is set as an upper threshold for the number of copies to be printed. When the number of copies to be printed, set by the user to perform the copy process, is more than the upper threshold set as a parameter condition, the image based on the scanned data is displayed as the preview image. The number-of-sheets condition indicates an upper threshold for the number of sheets to be printed in the copy process. An arbitrary number of sheets is set as the upper threshold for the number of sheets to be printed in the copy process. When the number of sheets to be printed in the copy process is more than the upper threshold set as the number-of-sheets condition, the image based on the scanned data is displayed as the preview image. As the preview display condition(s), the administrator is allowed to set at least one of the above conditions, i.e., the color setting and the number of copies to be printed included in the parameter conditions, and the number-of-sheets condition. In other words, the administrator is authorized to set a plurality of preview display conditions.

Further, the control program 32 accepts display information input by the administrator of the MFP 10 (S104). The display information represents whether to display the preview display condition(s) on the LCD 16 when the preview image is displayed based on fulfillment of the preview display condition(s). Therefore, when the administrator wishes the fulfilled preview display condition(s) to be displayed on the LCD 16 when the preview image is displayed, the administrator inputs, as the display information, information indicating that a setting for displaying the preview display condition(s) is valid. Meanwhile, when the administrator does not wish the fulfilled preview display condition(s) to be displayed on the LCD 16 when the preview image is displayed, the administrator inputs, as the display information, information indicating that the setting for displaying the preview display condition(s) is invalid. Thus, the control program 32 accepts the display information input by the administrator.

Further, the control program 32 accepts the print allowance condition input by the administrator of the MFP 10 (S106). As shown in FIG. 8, one of an individual-image print allowance condition and an all-image print allowance condition is settable as the print allowance condition. When the individual-image print allowance condition is set as the print allowance condition, each time a single preview image is displayed on the LCD 16, the MFP 10 is allowed to perform a printing process to print an image corresponding to the single preview image. Meanwhile, when the all-image print allowance condition is set as the print allowance condition, after all preview images are displayed on the LCD 16, the MFP 10 is allowed to perform a printing process to print images corresponding to all the preview images.

Further, the control program 32 accepts reconfiguration information input by the administrator of the MFP 10 via the input I/F 18 (S108). The reconfiguration information represents whether to display on the LCD 16 a screen (hereinafter referred to as a "reconfiguration screen") for reconfiguring setting items for performing the printing process to print the images displayed as the preview images when the MFP 10 is allowed to perform the said printing process. Therefore, when the administrator wishes the reconfiguration screen to be displayed on the LCD 16, the administrator inputs, as the reconfiguration information, information indicating that a setting for displaying the reconfiguration screen is valid. Meanwhile, when the administrator does not wish the reconfiguration screen to be displayed on the LCD 16, the administrator inputs, as the reconfiguration information, information indicating that the setting for displaying the reconfiguration screen is invalid. It is noted that the reconfiguration information is set only when the all-image print allowance condition is set as the print allowance condition. Namely, S108 (see FIG. 2) is executed only when the all-image print allowance condition is set as the print allowance condition, whereas S108 is skipped when the individual-image print allowance condition is set as the print allowance condition. In addition, the setting items to be reconfigured on the reconfiguration screen are setting items according to the preview display condition(s). Specifically, for instance, when the color copy of the parameter conditions is set as a preview display condition, it is possible to change a parameter for a setting item related to the print color on the reconfiguration screen. Further, when the number of copies to be printed, of the parameter conditions, is set as a preview display condition, it is possible to change a parameter for a setting item related to the number of copies to be printed, on the reconfiguration screen. Furthermore, when the number-of-sheets condition is set as a preview display condition, it is possible to change a parameter for a setting item related to the number of sheets to be printed, on the reconfiguration screen.

Thus, when the user with the administrative right inputs, into the MFP 10, the preview display condition(s), the display information, the print allowance condition, and the reconfiguration information, the control program 32 accepts the input conditions and information, thereby storing the accepted conditions and information into the data storage area 34. Then, using the preview display condition(s), the display information, the print allowance condition, and the reconfiguration information input by the user with the administrative right, a general user without the administrative right may perform the copy process by the MFP 10. A process to be performed in such a case will be described below.

In the MFP 10, when a copy process is started by the general user, the control program 32 displays a copy execution screen (not shown) on the LCD 16 (S110). On the copy execution screen, entry fields for receiving input parameters for the setting items for the copy process are displayed. Arbitrary parameters, input into the entry fields by the general user, are set for the setting items for the copy process. Then, the control program 32 accepts the parameters (hereinafter referred to as "input parameters") set by the user's input operations to the entry fields (S112). For instance, the setting items configurable on the copy execution screen may include the setting item indicating the print color, and the setting item indicating the number of copies to be printed.

The copy execution screen includes an execution button displayed thereon. When the execution button is operated (S114: Yes), the control program 32 sends a scan instruction to the scan engine 20 (S116). Thereby, the scan engine 20 starts a scanning process to scan a document set on the ADF (or a flatbed) of the MFP 10. Subsequently, the control program 32 determines whether the input parameters fulfill the parameter conditions of the preview display conditions (S118). For instance, when the color copy is set as a parameter condition, and an input parameter for the print setting item indicating the print color is color copy, it is determined that the input parameter fulfills the parameter condition. Further, when the upper threshold for the number of copies to be printed is set as a parameter condition, and an input parameter for the print setting item indicating the number of copies to be printed is more than the set upper threshold, it is determined that the input parameter fulfils the parameter condition.

Then, when determining that the input parameters fulfill the parameter conditions (S118: Yes), the control program 32 determines whether the display information indicates that the setting for displaying the preview display conditions is valid (S120). In this case, when determining that the display information indicates that the setting for displaying the preview display conditions is valid (S120: Yes), the control program 32 displays on the LCD 16 a condition confirmation screen 100 (see FIG. 9) (S122). The condition confirmation screen 100 displays thereon a comment 102 representing that the preview image will be displayed, and the preview display conditions 104 determined in S118 to be fulfilled. In the example of the condition confirmation screen 100 in FIG. 9, the color copy 104*a* and the number of copies to be printed 104*b*, included in the parameter conditions, and the number of sheets to be printed 104*c* of the number-of-sheets condition are shown. Nonetheless, it is noted that an actual condition confirmation screen 100 displays thereon only preview display condition(s) 104 determined in S118 to be fulfilled. Specifically, for instance, if only the color copy, included in the parameter conditions, is determined in S118 to be fulfilled, only the color copy 104*a* will be displayed as the preview display condition 104 on the condition confirmation screen 100. In another instance, if the color copy and the number of copies to be printed, included in the parameter conditions, are determined in S118 to be fulfilled, the color copy 104*a* and the number of copies to be printed 104*b* will be displayed as the preview display conditions 104 on the condition confirmation screen 100. Thereby, the user is allowed to recognize why the preview image is to be displayed. After the condition confirmation screen 100 is displayed on the LCD 16, the control program 32 proceeds to S124. Meanwhile, when determining in S120 that the display information indicates that the setting for displaying the preview display conditions is invalid (S120: No), the control program 32 skips S122 (i.e., in this case, the condition confirmation screen 100 is not displayed) and proceeds to S124.

Subsequently, in S124, the control program 32 determines whether the print allowance condition is the individual-image print allowance condition (S124). When determining that the print allowance condition is the individual-image print allowance condition (S124: Yes), the control program 32 performs an individual-image print execution subroutine for performing a printing process according to the individual-image print allowance condition (S126).

Figure 10:
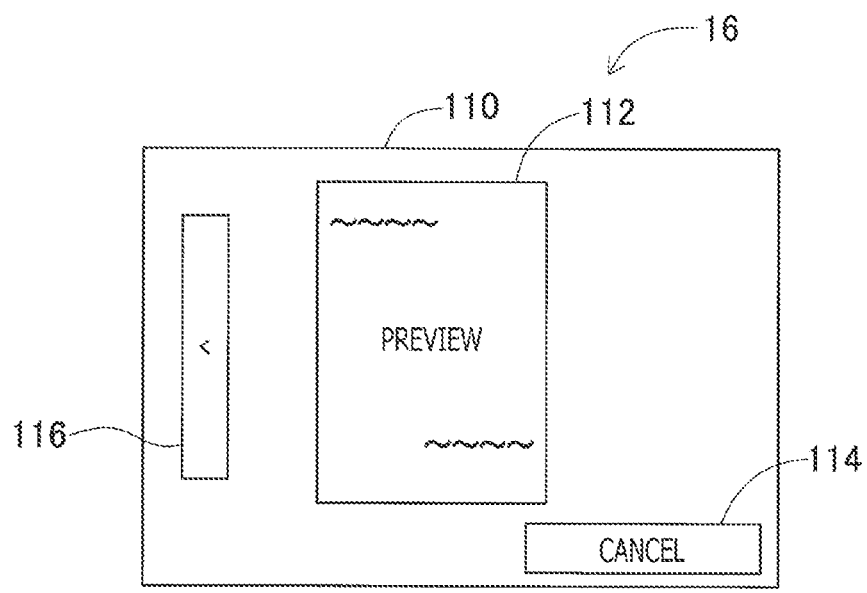
FIG. 10 shows an example of a preview screen in the illustrative embodiment according to one or more aspects of the present disclosure.

In the individual-image print execution subroutine, the control program 32 displays a preview screen 110 shown in FIG. 10 on the LCD 16 (S200). On the preview screen 110, a preview image 112 is displayed. As the preview image 112, an image, based on scanned data of a first page among one or more pages contained in the document that have been scanned by the scan engine 20, is displayed. In other words, for instance, when a document of a plurality of pages is set on the ADF, an image based on scanned data of a first page is displayed as the preview image 112.

Further, the preview screen 110 displays thereon a cancel button 114 and a feed button 116. When the cancel button 114 is operated (S202: Yes), the control program 32 goes back to S110 (see FIG. 3) of the main routine. Thereby, the copy execution screen is displayed on the LCD 16 instead of the preview screen 110. Namely, if the user confirms the preview image 112 and does not wish to print the image displayed as the preview image 112, the user may operate the cancel button 114, thereby cancelling the copy process for the document set on the ADF and causing the LCD 16 to display the copy execution screen to perform a new copy process.

When the feed button 116 is operated on the preview screen 110 (S204: Yes), the control program 32 sends a print instruction to the print engine 22 (S206). At this time, in S206, the control program 32 outputs the print instruction to print the image displayed as the preview image 112. Thereby, a printing process of printing the image displayed as the preview image 112 is performed by the print engine 22. Namely, in the printing process according to the individual-image print allowance condition, the image displayed as the preview image 112 is printed when the user operates the feed button 116 after confirming the preview image 112 on the preview screen 110.

Then, the control program 32 determines whether the images of all the pages contained in the document have been displayed as the preview images 112 (S208). When determining that not all of the images of the pages contained in the document have been displayed as the preview images 112 (S208: No), the control program 32 repeatedly performs the process of S200 to S206. Specifically, in the case where the document with the plurality of pages is set on the ADF, when the feed button 116 is operated while the image of the first page of the document is displayed as the preview image 112, the image of the first page of the document is printed. Then, an image of a second page of the document is displayed as the preview image 112 on the preview screen 110. In this state, when the feed button 116 is operated, the image of the second page of the document is printed, and an image of a third page of the document is displayed as the preview image 112 on the preview screen 110. Thus, in the printing process according to the individual-image print allowance condition, each time the feed button 116 is operated on the preview screen 110, a printing process of printing the image displayed as the preview image 112 is performed, and an image of a subsequent page of the document is sequentially displayed as the preview image 112. When determining that the images of all the pages contained in the document have been displayed as the preview images 112 (S208: Yes), the control program 32 terminates the individual-image print execution subroutine, as well as the main routine.

When determining that the print allowance condition is not the individual-image print allowance condition (i.e., the print allowance condition is the all-image print allowance condition) (S124: No), the control program 32 performs an all-image print execution subroutine for performing a printing process according to the all-image print allowance condition (S128).

In the all-image print execution subroutine, the control program 32 displays on the LCD 16 the preview screen 110 shown in FIG. 10 (S300). Namely, in the all-image print execution subroutine, the preview screen 110 is displayed in substantially the same manner as in the individual-image print execution subroutine. Then, when the cancel button 114 is operated on the preview screen 110 (S302: Yes), the control program 32 goes back to S110 (see FIG. 3) of the main routine in substantially the same manner as in the individual-image print execution subroutine. When the feed button 116 is operated on the preview screen 110 (S304: Yes), the control program 32 determines whether a next page of the image displayed as the preview image 112 is a final page of all the pages contained in the document (S306). At this time, when determining that the next page of the image displayed as the preview image 112 is not the final page of all the pages contained in the document (S306: No), the control program 32 repeatedly performs the process of S300 to S304. Meanwhile, when determining that the next page of the image displayed as the preview image 112 is the final page of all the pages contained in the document (S306: Yes), the control program 32 goes to S308.

Specifically, for instance, in a case where a document of three pages is set on the ADF, when the feed button 116 is operated (S304: Yes) while the image of the first page is displayed as the preview image 112, the control program 32 goes to S306 and determines that the next page (i.e., the second page) of the image (i.e., the first page) displayed as the preview image 112 is not the final page of all the pages contained in the document (S306: No). In this case, the control program 32 goes back to S300 and displays the image of the second page as the preview image 112 on the preview screen 110. Further, when the feed button 116 is operated (S304: Yes) while the image of the second page is displayed as the preview image 112, the control program 32 proceeds to S306 and determines that the next page (i.e., the third page) of the image (i.e., the second page) displayed as the preview image 112 is the final page of all the pages contained in the document (S306: Yes). In this case, the control program 32 proceeds to S308.

Figure 11:
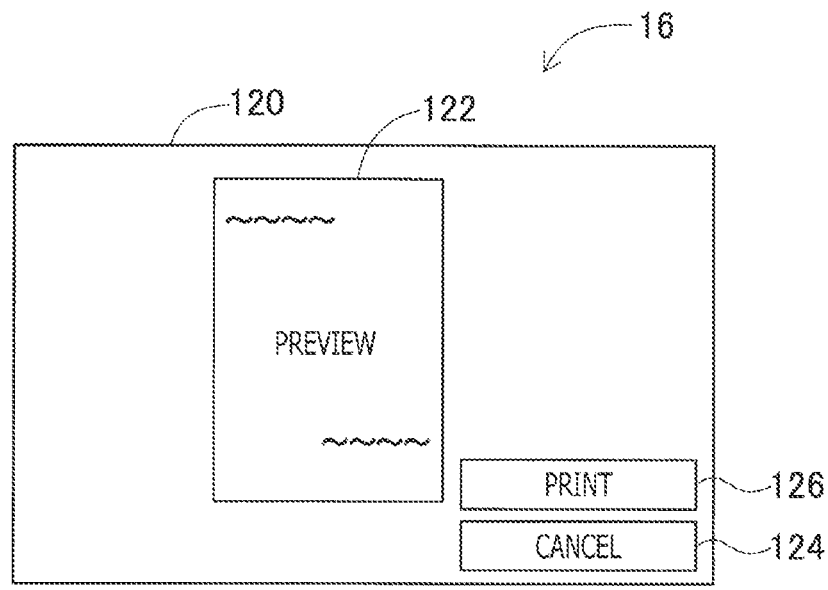
FIG. 11 shows an example of a first final preview screen in the illustrative embodiment according to one or more aspects of the present disclosure.

In S308, the control program 32 determines whether the reconfiguration information indicates that the setting for displaying the reconfiguration screen is valid. When determining that the reconfiguration information does not indicate that the setting for displaying the reconfiguration screen is valid (i.e., the reconfiguration information indicates that the setting for displaying the reconfiguration screen is invalid (S308: No), the control program 32 displays on the LCD 16 a first final preview screen 120 shown in FIG. 11 (S310). On the first final preview screen 120, a preview image 122 is displayed. As the preview image 122, an image based on scanned data of the final page of the document is displayed. Further, the first final preview screen 120 displays thereon a cancel button 124 and a print button 126. When the cancel button 124 is operated (S312: Yes), the control program 32 goes back to S110 (see FIG. 3) of the main routine. When the print button 126 is operated (S314: Yes), the control program 32 terminates the all-image print execution subroutine, and goes to S130 (see FIG. 4) of the main routine to send a print instruction to the print engine 22. At this time, in S130, the control program 32 outputs the print instruction to print the images of all the pages of the document for which the scanning process has been completed. Thereby, the images of all the pages contained in the document are printed. Thus, in the printing process according to the all-image print allowance condition, the images of all the pages contained in the document are printed when the user operates the print button 126 after completion of confirming all the images displayed as the preview images 112 on the preview screen 110 and as the preview image 122 on the preview screen 120.

When determining in S308 that the reconfiguration information indicates that the setting for displaying the reconfiguration screen is valid (S308: Yes), the control program 32 displays a second final preview screen (not shown) on the LCD 16 (S316). The second final preview screen is substantially the same screen as the first final preview screen 120 (see FIG. 11). However, it is noted that the second final preview screen displays thereon not only a preview image, a print button, and a cancel button but also a reconfiguration button. When the cancel button is operated on the second final preview screen, substantially the same process is performed as when the cancel button 124 is operated on the first final preview screen 120. Further, when the print button is operated on the second final preview screen, substantially the same process is performed as when the print button 126 is operated on the first final preview screen 120.

When the reconfiguration button is operated on the second final preview screen (S322: Yes), the control program 32 displays a reconfiguration screen 140 (see FIG. 12) on the LCD 16 (S324). The reconfiguration screen 140 displays thereon setting fields 142 for reconfiguring the setting items according to the preview display conditions. In an example of the reconfiguration screen 140 shown in FIG. 12, setting fields 142a, 142b, and 142c are displayed. The setting fields 142a are for reconfiguring the setting item related to the print color. The setting field 142b is for reconfiguring the setting item related to the number of copies to be printed. The setting fields 142c are for reconfiguring a setting item related to printing side(s). However, an actual reconfiguration screen 140 displays thereon setting field(s) for reconfiguring setting item(s) corresponding to the preview display condition(s) determined in S118 to be fulfilled. Specifically, for instance, if only the color copy, included in the parameter conditions for the preview display conditions, is determined in S118 to be fulfilled, the reconfiguration screen 140 will display thereon only the setting fields 142a for reconfiguring the setting item related to the print color. In another instance, if the color copy and the number of copies to be printed, included in the parameter conditions for the preview display conditions, are determined in S118 to be fulfilled, the reconfiguration screen 140 will display thereon the setting fields 142a for reconfiguring the setting item related to the print color, and the setting field 142b for reconfiguring the setting item related to the number of copies to be printed.

When one of the setting fields 142 is operated by the user (S326: Yes), the control program 32 changes the input parameter for the corresponding setting item to the parameter according to the operated setting field 142 (S328). Thereby, the reconfiguration screen 140 is displayed according to the reconfiguration information. Then, by operating the setting fields 142 on the reconfiguration screen 140, the user is allowed to change the parameters for the setting items according to the preview display conditions. When none of the setting fields 142 is operated (S326: No), the control program 32 skips S326.

The reconfiguration screen 140 also displays thereon a cancel button 144 and a print button 146. When the cancel button 144 is operated (S330: Yes), the control program 32 goes back to S110 (see FIG. 3) of the main routine. Meanwhile, when the print button 146 is operated (S332: Yes), the control program 32 terminates the all-image print execution subroutine, and sends a print instruction to the print engine 22 in S130 (see FIG. 4) of the main routine. At this time, the control program 32 outputs the print instruction to print the images of all the pages of the document for which the scanning process has been completed. Thereby, the images of all the pages contained in the document are printed.

The processes of S200, S300, S310, and S316 may be executed in parallel with the scanning process based on the scan instruction output in S116. Therefore, when a corresponding one of the preview screens (i.e., the preview screen 110, the first final preview screen 120, and the second final preview screen) is displayed in each of the steps S200, S300, S310, and S316, the scanning process to scan a page of the document to be displayed as the preview image 112 or 122 may not have been completed. Therefore, in such a case, for instance, the control program 32 may display on the LCD 16 a comment representing that the scanning process is in progress, at a location of the preview image 112 or 122, and may put the MFP 10 into a standby state. Then, after completion of the scanning process to scan the page of the document to be displayed as the preview image 112 or 122, the control program 32 may display the preview image 112 or 122.

When determining in S118 that the input parameters do not fulfill the parameter conditions (S118: No), the control program 32 determines whether the scanning process to scan all the pages contained in the document set on the ADF has been completed (S132). When determining that the scanning process to scan all the pages contained in the document set on the ADF has not been completed (S132: No), the control program 32 calculates a planned number of sheets to be printed as the number of sheets to be printed in the printing process based on the scanned data of all the pages of the document for which the scanning process has been completed (S134). Namely, the control program 32 identifies the number of pages of the document for which the scanning process has been completed, and calculates the planned number of sheets to be printed, by multiplying the identified number of pages contained in the document by the number of copies to be printed that is an input parameter. Then, the control program 32 determines whether the planned number of sheets to be printed fulfills the number-of-sheets condition (S136). At this time, when the upper threshold for the number of sheets to be printed is set as a preview display condition, and the planned number of sheets to be printed is more than the set upper threshold, the control program 32 determines that the planned number of sheets to be printed fulfills the number-of-sheets condition (S136: Yes).

Figure 9:
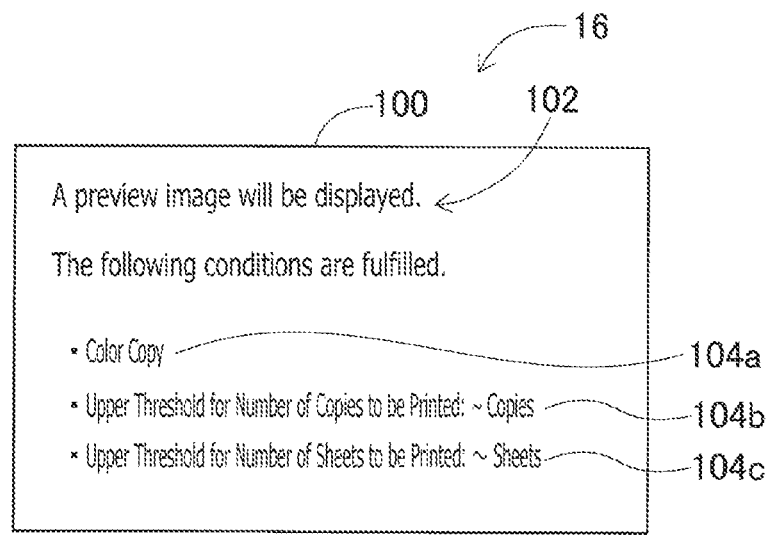
FIG. 9 shows an example of a condition confirmation screen in the illustrative embodiment according to one or more aspects of the present disclosure.

Then, when determining that the planned number of sheets to be printed fulfills the number-of-sheets condition (S136: Yes), the control program 32 executes S120 and the subsequent steps. The processes of S120 and the subsequent steps to be executed when the planned number of sheets to be printed fulfills the number-of-sheets condition (S136: Yes) is substantially the same as the processes of S120 and the subsequent steps to be executed when the input parameters fulfill the parameter conditions (S118: Yes). Therefore, an explanation will be provided of only differences therebetween. First, in S122, the condition confirmation screen 100 shown in FIG. 9 is displayed on the LCD 16. In this regard, on the condition confirmation screen 100 in the case where the planned number of sheets to be printed fulfills the number-of-sheets condition (S136: Yes), only the preview display condition 104 that is determined in S136 to be fulfilled, i.e., only the number of sheets to be printed 104c of the number-of-sheets condition is displayed.

Figure 12:
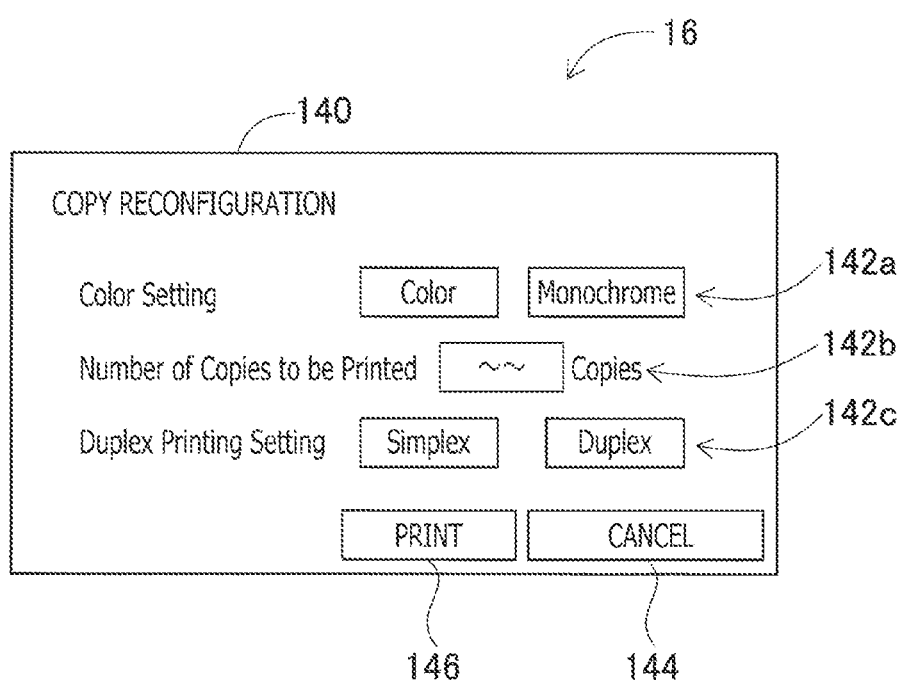
FIG. 12 shows an example of a reconfiguration screen in the illustrative embodiment according to one or more aspects of the present disclosure.

The processes of S200, S300, S310, and S316 in the case where the planned number of sheets to be printed fulfills the number-of-sheets condition (S136: Yes) are performed after the scanning process to scan all the pages contained in the document has been completed (S132: Yes). Therefore, the MFP 10 is not brought into the aforementioned standby state. In S324, the reconfiguration screen 140 as shown in FIG. 12 is displayed on the LCD 16. In this regard, on the resetting screen 140 in the case where the planned number of sheets to be printed fulfills the number-of-sheets condition (S136: Yes), the setting fields 142 are displayed to reconfigure the setting item according to the preview display condition determined in S136 to be fulfilled. Namely, the setting fields 142 for reconfiguring the number of sheets to be printed are displayed. Nonetheless, it is noted that the setting fields 142 referred to here are not for directly reconfiguring the number of sheets to be printed, but for indirectly reconfiguring the number of sheets to be printed. Specifically, the setting fields 142c for reconfiguring the setting item related to the printing side(s) are displayed. Thereby, for instance, if the setting item related to the printing side(s) is set to simplex printing, and the number of sheets to be printed is 10, the number of sheets to be printed is changed from 10 to 5 by reconfiguring the setting item related to the printing side(s) to duplex printing.

Except for the above differences, when the processes of S120 and the subsequent steps are performed in the case where the planned number of sheets to be printed fulfills the number-of-sheets condition (S136: Yes), substantially the same effects as when the input parameters fulfill the parameter conditions (S118: Yes) are produced.

When the planned number of sheets to be printed does not fulfill the number-of-sheets condition (S136: No), the control program 32 sends to the print engine 22 a print instruction to print the images of all the pages of the document for which the scanning process has been completed (S130). Thereby, the images of all the pages contained in the document are printed. Namely, when the input parameters do not fulfill the parameter conditions (S118: No), and the planned number of sheets to be printed does not fulfill the number-of-sheets condition (S136: No), the preview image is not displayed, and the copy process is performed in response to an operation to the execution button on the copy execution screen (not shown).

The aforementioned illustrative embodiment produces the following advantageous effects. The control program 32 obtains image data for a plurality of pages, and causes the LCD 16 to display, as the preview image 112, an image based on image data for at least one page among the obtained image data for the plurality of pages. Then, when a display mode for the image displayed as the preview image 112 fulfills the print allowance condition, the control program 32 sends to the print engine 22 a print instruction to print the image displayed as the preview image 112. Thereby, it is possible to perform a printing process to print the image confirmed by the user in accordance with the print allowance condition.

The control program 32 receives the print allowance condition input by the administrator of the MFP 10, and stores the print allowance condition in the data storage area 34. Then, the control program 32 sends, to the print engine 22, an instruction to print the image displayed as the preview image 112 in accordance with the print allowance condition stored in the data storage area 34. Thereby, it is possible to perform the printing process to print the image displayed as the preview image in accordance with the intention of the administrator of the MFP 10.

Further, when the print allowance condition that an image based on image data for a particular page among the obtained image data for the plurality of pages is displayed as the preview image 112 is fulfilled, the control program 32 sends to the print engine 22 a print instruction to print the image displayed as the preview image 112. Thereby, it possible to appropriately perform the printing process.

The particular page is specified by a user operation to the feed button 116 on the preview screen 110. Thereby, it is possible to specify the particular page according to the user's intention.

When the print allowance condition that an image based on image data for each page among the image data for the plurality of pages is displayed as the preview image of the particular page is fulfilled, the control program 32 sends to the print engine 22 an instruction to print the image of each page. Thereby, the user is allowed to confirm the image of each page and thereafter individually print the confirmed image.

Further, when the print allowance condition that the images based on the image data for all the plurality of pages, among the image data for the plurality of pages, are displayed as the preview images of the particular pages, the control program 32 sends to the print engine 22 an instruction to print the images of all the plurality of pages. Thereby, the user is allowed to confirm the images of all the plurality of pages and thereafter print all the confirmed images.

The control program 32 receives the preview display condition(s) for displaying a candidate image to be printed as a preview image, and displays the preview image on the LCD 16 when the preview display condition(s) are fulfilled. Further, the control program 32 receives the print allowance condition for allowing the MFP 10 to perform a printing process to print the image displayed as the preview image on the LCD 16, and outputs a print instruction to print the image displayed as the preview image on the LCD 16 when the print allowable condition is fulfilled. Thereby, the MFP 10 performs the printing process to print the image displayed as the preview image on the LCD 16. Thus, the MFP 10 may display on the LCD 16 a preview image according to arbitrary preview display condition(s), and may perform a printing process to print an image displayed as the preview image, according to an arbitrary print allowance condition.

The control program 32 displays, as preview images, images based on the image data for the plurality of pages on a page-by-page basis while switching from one image based on image data for one page to another image based on image data for another page, among the obtained image data for the plurality of pages. Then, when a print allowance condition that all of the images based on the image data for the plurality of pages have been displayed is fulfilled, the control program 32 causes the print engine 22 to perform printing based on the image data for the plurality of pages. Thereby, the user is allowed to appropriately confirm each individual image of all the images based on the image data for the plurality of pages by switching from one image based on image data for one page to another image based on image data for another page, and thereafter cause the MFP 10 to print all of the images based on the image data for the plurality of pages.

Further, when a print allowance condition that an image based on image data for a particular page, among the image data for the plurality of pages, is displayed as a preview image in response to a user operation to the feed button 116 on the preview screen 110 is fulfilled, the control program 32 causes the print engine 22 to perform printing of the image displayed as the preview image. Thereby, the user is allowed to cause the MFP 10 to print the image of the page specified by the user operation.

Further, when the image based on the image data for the particular page, among the image data for the plurality of pages, is displayed as the preview image in response to the user operation to the feed button 116 on the preview screen 110, the control program 32 causes the print engine 22 to perform printing based on the image data for the plurality of pages, provided that the print button 126 is operated on the first final preview screen 120. Thereby, the user is allowed to cause the MFP 10 to perform printing based on the image data for the plurality of pages, by the operation to the print button 126 as final confirmation.

The control program 32 receives the parameter conditions as preview display conditions, and displays the preview image on the LCD 16 when the parameter conditions are fulfilled. Thereby, for instance, by setting, as the parameter conditions, parameters such as a parameter for printing with use of a large amount of ink, and a parameter for printing with use of color ink, the user is allowed to check the preview image for an image to be printed, in advance of execution of the printing with use of a large amount of ink or the printing with use of color ink.

The control program 32 receives the number-of-sheets condition as a preview display condition, and displays the preview image on the LCD 16 when the number-of-sheets condition is fulfilled. The number-of-sheets condition is a condition indicating the number of sheets to be printed that is calculated by using the number of document sheets based on the scanned data and the number of copies to be printed which is a print parameter. Namely, the number-of-sheets condition is a condition regarding the scanned document. The upper threshold for the number of sheets to be printed is set as the number-of-sheets condition. When the calculated planned number of sheets to be printed is more than the set upper threshold, the number-of-sheets condition is fulfilled, and the preview image is displayed on the LCD 16. Thereby, the user is allowed to check the preview images for images to be printed, in advance of execution of printing for a large number of sheets.

The control program 32 receives the preview display condition(s) for displaying a candidate image to be printed as a preview image, and displays the preview image on the LCD 16 when the preview display condition(s) are fulfilled. Further, when the preview image is displayed on the LCD 16, the control program 32 displays on the LCD 16 a reconfiguration screen 140 with an inquiry about whether to restrict a printing process. Thereby, the user is allowed to restrict the printing process after checking the preview image.

Further, the control program 32 receives, via the input I/F 18, the reconfiguration information representing whether to display the reconfiguration screen 140. Thereby, it is possible for the MFP 10 to display the reconfiguration screen 140 according to the user's intention.

The control program 32 receives input parameters as parameters for the candidate image to be printed. Then, the control program 32 displays the preview image on the LCD 16 when the input parameters fulfill the parameter conditions of the preview display conditions. Then, the control program 32 displays on the LCD 16 the reconfiguration screen 140 with an inquiry about whether to restrict a printing process conforming to the parameter conditions. Thereby, in advance of the printing process conforming to the parameter conditions, the user is allowed to check the image to be printed and restrict the printing process conforming to the parameter conditions.

Specifically, for instance, when color copy is set as a parameter condition of the preview display conditions, and an input parameter is color copy, the control program 32 displays the preview image on the LCD 16. Then, the control program 32 displays on the LCD 16 the reconfiguration screen 140 to perform a printing process according to monochrome printing instead of color printing. Thereby, it is possible for the MFP 10 to perform a printing process with a restricted amount of color ink to be used. Further, for instance, when the upper threshold for the number of copies to be printed is set as a parameter condition of the preview display conditions, and the number of copies to be printed as an input parameter is more than the upper threshold, the control program 32 displays the preview image on the LCD 16. Then, the control program 32 displays on the LCD 16 the reconfiguration screen 140 to perform a printing process for the number of copies to be printed equal to or less than the upper threshold. Thereby, it is possible for the MFP 10 to perform a printing process with a restricted number of copies to be printed.

The control program 32 receives the number-of-sheets condition as a preview display condition, and displays the preview image on the LCD 16 when the number-of-sheets condition is fulfilled. Then, the control program 32 displays on the LCD 16 the reconfiguration screen 140 to restrict the number-of-sheets condition. The number-of-sheets condition is a condition indicating the number of sheets to be printed that is calculated by using the number of document sheets based on the scanned data and the number of copies to be printed which is a print parameter. Namely, the number-of-sheets condition is a condition regarding the scanned document. Therefore, when the upper threshold for the number of sheets to be printed is set as the number-of-sheets condition, and the calculated planned number of copies to be printed is more than the set upper threshold for the number of sheets to be printed, the number-of-sheets condition is fulfilled, and the control program 32 displays the preview image on the LCD 16. Then, the control program 32 displays on the LCD 16 the reconfiguration screen 140 to perform a printing process for the number of sheets to be printed equal to or less than the upper threshold. Thereby, it is possible for the MFP 10 to perform a printing process with a restricted number of sheets to be printed.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

In the aforementioned illustrative embodiment, when the images based on the image data for all the plurality of pages, among the image data for the plurality of pages, are displayed as the preview images 112, the all-image print allowance condition is fulfilled, and the control program 32 outputs a print instruction to print the images of all the plurality of pages. However, for instance, when images based on image data for a particular rate of pages, among the image data for the plurality of pages, are displayed as the preview images 112 (e.g., when images based on image data for 5 pages, among the image data for 10 pages, are displayed as the preview images 112), a print allowance condition may be fulfilled, and the control program 32 may output a print instruction to print the images of the particular rate of pages. In another instance, when one or more images each containing a large amount of text data, among the image data for the plurality of pages, are displayed as the preview images 112, the control program 32 may output a print instruction to print the images displayed as the preview images 112.

In the aforementioned illustrative embodiment, when the display mode for the image displayed as the preview image 112 fulfills the print allowance condition, the control program 32 outputs a print instruction to print the image displayed as the preview image 112. However, the control program 32 may output a print instruction to print one or more images not displayed as the preview images 112. For instance, when images based on image data for 5 pages, among the image data for 10 pages, are displayed as the preview images 112, the control program 32 may output a print instruction to print the images of 10 pages including 5 pages not displayed as the preview images 112.

In the aforementioned illustrative embodiment, when the display mode for the image based on the scanned data in the copy process fulfills the print allowance condition, the control program 32 outputs a print instruction to print the image based on the scanned data. However, when a display mode for an image based on image data stored in the data storage area 34 in the printing process fulfills the print allowance condition, the control program 32 may output a print instruction to print the image based on the stored image data. More specifically, when, in the printing process, image data is selected by a user operation from among the image data stored in the data storage area 34, and a display mode for an image based on the selected image data fulfills the print allowance condition, the control program 32 may output a print instruction to print the image based on the selected image data. Further, when a display mode for an image based on image data obtained from a device different from the MFP 10 fulfills the print allowance condition, the control program 32 may output a print instruction to print the image based on the obtained image data.

In the aforementioned illustrative embodiment, the control program 32 displays, as the preview images, the images based on the image data for the plurality of pages on a page-by-page basis while switching from one image based on image data for one page to another image based on image data for another page, among the obtained image data for the plurality of pages. Afterward, the control program 32 performs the printing process to print the images based on the image data for the plurality of pages, in response to the print button 126 being operated on the first final preview screen 120. However, for instance, even though the print button 126 is not operated, the control program 32 may perform the printing process when a print allowance condition that the first final preview screen 120 continues to be displayed for a particular period of time is fulfilled. Further, the control program 32 may perform the printing process when a print allowance condition that the cancel button 124 is not operated on the first final preview screen 120 is fulfilled.

In the aforementioned illustrative embodiment, when the all-image print allowance condition that all of the images based on the scanned data generated by scanning the document have been displayed as the preview images is fulfilled, the control program 32 performs the printing process to print all of the images displayed as the preview images, provided that the print button 126 is operated on the first final preview screen 120. However, a condition that the print button 126 is operated on the first final preview screen 120 may be set as a print allowance condition. In this case, the control program 32 may perform the printing process when the set print allowance condition is fulfilled.

In the aforementioned illustrative embodiment, the printing process is restricted by restricting at least one of the parameter conditions and the number-of-sheets condition, i.e., by restricting at least one of printing with color copy set as a print parameter, printing for the number of copies to be printed more than the upper threshold, and printing for the number of sheets to be printed more than the upper threshold. However, the printing process itself may be restricted from being performed. Namely, when the preview display condition(s) are fulfilled, and a preview image is displayed on the LCD 16, the control program 32 may forcibly cancel a printing process to print an image displayed as the preview image. In this case, the control program 32 may display on the LCD 16 a notification screen to provide a notification that the printing process has been cancelled.

In the aforementioned illustrative embodiment, the example in which the processes shown in FIGS. 2 to 7 are performed by the CPU 12 has been described. However, the processes shown in FIGS. 2 to 7 may not necessarily be performed by the CPU 12, but may be performed by an ASIC or another logic integrated circuit, or by at least two of processors such as CPUs, ASICs, and other logic integrated circuits in cooperation with each other.

The following shows examples of associations between elements exemplified in the aforementioned illustrative embodiments and modifications and elements according to aspects of the present disclosure. The MFP 10 may be an example of a "printer" according to aspects of the present disclosure. The CPU 12 may be an example of a "processor" according to aspects of the present disclosure. The memory 14 may be an example of a "memory" according to aspects of the present disclosure. The memory 14 storing the control program 32 may be an example of a "non-transitory computer-readable medium storing computer-readable instructions" according to aspects of the present disclosure. The CPU 12 and the memory 14 storing the control program 32 may be included in a "controller" according to aspects of the present disclosure. The LCD 16 may be an example of a "display" according to aspects of the present disclosure. The input I/F 18 may be an example of a "user interface" according to aspects of the present disclosure. The print allowance condition accepted in S106 (see FIG. 2) may be an example of a "print start condition" according to aspects of the present disclosure. The feed button 16 and the print button 126 may be included in examples of an "object" according to aspects of the present disclosure, and may be included in examples of a "print execution object" according to aspects of the present disclosure. The cancel button 114 and the cancel button 124 may be included in examples of a "print cancellation object" according to aspects of the present disclosure. The reconfiguration screen (see FIG. 12) may be an example of a "notification screen" according to aspects of the present disclosure.

What is claimed is:

1. A printer comprising:
   a memory;
   a display; and
   a controller configured to:
   store information on a print start condition in the memory;
   obtain image data for a plurality of pages displayable on the display with the information on the print start condition stored in the memory;
   after obtaining the image data of the plurality of pages, display, on the display, a preview screen configured to display thereon at least one preview image based on image data for at least one page among the obtained image data for the plurality of pages;
   after beginning to display the at least one preview image on the preview screen, determine whether a display mode for the at least one preview image displayed on the preview screen fulfills the print start condition indicated by the information stored in the memory; and
   perform printing based on the obtained image data when determining that the display mode for the at least one preview image displayed on the preview screen fulfills the print start condition, the controller determining that the print start condition is fulfilled when a particular operation is performed on the preview screen while a particular preview image is being displayed on the preview screen based on image data for a particular page of the plurality of pages.

2. The printer according to claim 1, further comprising a user interface and a memory,
   wherein the controller is further configured to:
   receive the print start condition via the user interface.

3. The printer according to claim 1,
   wherein the controller is further configured to:
   perform the printing based on the obtained image data, when the display mode for the at least one preview image displayed on the display fulfills the print start condition including a condition that the particular preview image based on the image data for the particular page is displayed.

4. The printer according to claim 3, further comprising a user interface,
   wherein the controller is further configured to:
   receive, via the user interface, an operation to specify the particular page of the plurality of pages contained in the obtained image data; and
   perform the printing based on the obtained image data, when the display mode for the at least one preview image displayed on the display fulfills the print start condition including a condition that the particular preview image based on the image data for the particular page is displayed in response to the operation received via the user interface.

5. The printer according to claim 3,
   wherein the controller is further configured to, each time a single page is specified from among the plurality of pages contained in the obtained image data, perform:
   displaying on the display a single preview image based on image data for the specified single page; and
   performing printing based on the image data for the specified single page, when a display mode for the single preview image displayed on the display fulfills the print start condition including the condition that the particular preview image based on the image data for the particular page is displayed.

6. The printer according to claim 3, further comprising a user interface,
   wherein the controller is further configured to:
   when the particular preview image based on the image data of the particular page is displayed, display on the display an object configured to, when operated, provide a print instruction to perform the printing based on the obtained image data; and perform the printing based on the obtained image data in response to the object being operated via the user interface, when the display mode for the at least one preview image displayed on the display fulfills the print start condition including the condition that the particular preview image based on the image data for the particular page is displayed.

7. The printer according to claim 1,
wherein the controller comprises:
   a processor; and
   a non-transitory computer-readable medium storing computer-readable instructions configured to, when executed by the processor, cause the controller to:
      store the information on the print start condition in the memory;
      obtain the image data for the plurality of pages with the information on the print start condition stored in the memory;
      after obtaining the image data of the plurality of pages, display, on the display, the preview screen configured to display thereon the at least one preview image based on the image data for the at least one page;
      after beginning to display the at least one preview image on the preview screen, determine whether the display mode for the at least one preview image displayed on the preview screen fulfills the print start condition indicated by the information stored in the memory; and
      perform the printing based on the obtained image data, when determining that the display mode for the at least one preview image displayed on the preview screen fulfills the print start condition.

8. A printer comprising:
a memory;
a display;
a user interface; and
a controller configured to:
   receive, via the user interface, a display condition for displaying at least one preview image of at least one page on the display, and a print condition for performing printing of the at least one page;
   store, in the memory, information on the received display condition and the received print condition;
   obtain image data for the at least one page with the information on the display condition and the print condition stored in the memory;
   determine whether the display condition indicated by the information stored in the memory is fulfilled based on print settings for the obtained image data;
   when determining that the display condition is fulfilled, display on the display a preview screen configured to display thereon the at least one preview image based on the obtained image data;
   after beginning to display the at least one preview image on the preview screen, determine whether the print condition indicated by the information stored in the memory is fulfilled based on a display mode for the at least one preview image displayed on the preview screen; and
   perform the printing based on the image data for the at least one preview image displayed on the display, when determining that the print condition is fulfilled the controller determining that the print condition is fulfilled when a particular operation is performed on the preview screen while a particular preview image is being displayed on the preview screen based on image data for a particular page of the at least one page.

9. The printer according to claim 8,
wherein the controller is further configured to:
   obtain the image data for a plurality of pages;
   when the received display condition is fulfilled, display on the display a plurality of preview images based on the obtained image data for the plurality of pages on a page-by-page basis while switching from one preview image based on image data for one page to another preview image based on image data for another page, among the obtained image data for the plurality of pages;
   receive, as the print condition, a condition that a particular time elapses after all the plurality of preview images based on the obtained image data for the plurality of pages have been displayed on the display; and
   perform the printing based on the image data for the plurality of pages, when the print condition that the particular time elapses after all the plurality of preview images based on the obtained image data for the plurality of pages have been displayed on the preview screen is fulfilled.

10. The printer according to claim 8,
wherein the controller is further configured to:
   obtain the image data for a plurality of pages;
   receive, via the user interface, an operation to specify one of the plurality of pages contained in the obtained image data;
   when the received display condition is fulfilled, display on the display a specific preview image based on image data for the specified page of the plurality of pages, in response to the operation received via the user interface;
   receive, as the print condition, a condition that the particular preview image based on the image data for the particular page of the plurality of pages is displayed in response to the operation received via the user interface; and
   perform printing based on the image data for the specific preview image displayed on the display, when the print condition that the particular preview image based on the image data for the particular page of the plurality of pages is displayed in response to the operation received via the user interface is fulfilled.

11. The printer according to claim 10,
wherein the controller is further configured to:
   display on the display a print cancellation object for cancelling the printing ef based on the image data for the preview image displayed on the display; and
   when the print condition that the particular preview image based on the image data for the particular page of the plurality of pages is displayed in response to the operation received via the user interface is fulfilled, perform the printing based on the image data for the specific preview image displayed on the display, provided that the print cancellation object is not operated.

12. The printer according to claim 10,
wherein the controller is further configured to:
   display on the display a print execution object for performing the printing of the preview image displayed on the display; and when the print condition that the particular preview image based on the image data for the particular page of the plurality of pages is displayed in response to the operation received via the user interface is fulfilled, perform the printing based on the image data for the specific preview image displayed on the display, provided that the print execution object is operated.

13. The printer according to claim 8, wherein the controller is further configured to:
   receive, via the user interface, a print parameter for a setting item for performing the printing based on the obtained image data;
   receive, as the display condition, a condition that the received print parameter is a particular print parameter; and
   when the display condition that the received print parameter is the particular print parameter is fulfilled, display on the display the at least one preview image based on the obtained image data.

14. The printer according to claim 13, wherein the controller is further configured to:
   display on the display a print execution object for performing the printing of the at least one image displayed on the display;
   receive, as the print condition, a condition that the print execution object is operated via the user interface; and
   when the print condition that the print execution object is operated via the user interface is fulfilled, perform the printing based on the image data for the at least one preview image displayed on the display.

15. The printer according to claim 8, wherein the controller is further configured to:
   obtain, as the image data, scanned data generated by scanning a document;
   receive, as the display condition, a condition regarding the document scanned to generate the scanned data; and
   when the received condition regarding the document is fulfilled, display on the display the at least one preview image based on the obtained image data.

16. The printer according to claim 8, wherein the controller comprises:
   a processor; and
   a non-transitory computer-readable medium storing computer-readable instructions configured to, when executed by the processor, cause the controller to:
      receive, via the user interface, the display condition for displaying the at least one preview image of the at least one page on the display, and the print condition for performing printing of the at least one page;
      store, in the memory, the information on the received display condition and the received print condition;
      obtain the image data for the at least one page with the information on the display condition and the print condition stored in the memory;
      determine whether the display condition indicated by the information stored in the memory is fulfilled based on the print settings for the obtained image data;
      when determining that the display condition is fulfilled, display on the display the preview screen configured to display thereon the at least one preview image based on the obtained image data;
      after beginning to display the at least one preview image on the preview screen, determine whether the print condition indicated by the information stored in the memory is fulfilled based on the display mode for the at least one preview image displayed on the preview screen; and
      perform the printing based on the image data for the at least one preview image displayed on the display, when determining that the print condition is fulfilled.

17. A printer comprising:
   a memory
   a display;
   a user interface; and
   a controller configured to:
      receive, via the user interface, a plurality of display conditions for displaying at least one preview image of at least one page on the display;
      store information on the received plurality of display conditions in the memory, the plurality of display conditions being associated with different print settings, respectively;
      obtain image data for the at least one page with the information on the plurality of display conditions stored in the memory;
      determine whether the plurality of display conditions indicated by the information stored in the memory are fulfilled based on print settings for the obtained image data;
      when determining that at least one of the plurality of display conditions is fulfilled, display on the display a preview screen configured to display thereon the at least one preview image based on the obtained image data; and
      prior to the preview screen being displayed on the display, display on the display a notification screen to show information about one or more display conditions that are determined to be fulfilled among the plurality of display conditions.

18. The printer according to claim 17, wherein the controller is further configured to:
   receive, via the user interface, information representing whether to display the notification screen; and
   prior to the preview screen being displayed on the display, display on the display the notification screen, provided that the received information represents to display the notification screen.

19. The printer according to claim 17, wherein the controller is further configured to:
   receive, via the user interface, a print parameter for a setting item for performing a printing process;
   receive the plurality of display conditions including a condition that the received print parameter is a particular print parameter;
   when the received condition that the received print parameter is the particular print parameter is fulfilled, display on the display the at least one preview image based on the obtained image data; and
   prior to the preview screen being displayed on the display, display on the display the notification screen with information representing that the received condition that the received print parameter is the particular print parameter is fulfilled.

20. The printer according to claim 19,
wherein the controller is further configured to:
  receive the plurality of display conditions including a condition that the received print parameter indicates color printing;
  when the received condition that the received print parameter indicates color printing is fulfilled, display on the display the at least one preview image based on the obtained image data; and
  prior to the preview screen being displayed on the display, display on the display the notification screen with information representing that the received condition that the received print parameter indicates color printing is fulfilled.

21. The printer according to claim 19,
wherein the controller is further configured to:
  receive the plurality of display conditions including a condition that the received print parameter indicates printing for more than a particular number of copies;
  when the received condition that the received print parameter indicates printing for more than the particular number of copies is fulfilled, display on the display the at least one preview image based on the obtained image data; and
  prior to the preview screen being displayed on the display, display on the display the notification screen with information representing that the received condition that the received print parameter indicates printing for more than the particular number of copies is fulfilled.

22. The printer according to claim 17,
wherein the controller is further configured to:
  obtain, as the image data, scanned data generated by scanning a document;
  receive the plurality of display conditions including a condition regarding the document scanned to generate the scanned data;
  when the received condition regarding the scanned document is fulfilled, display on the display the at least one preview image based on the obtained image data; and
  prior to the preview screen being displayed on the display, display on the display the notification screen with information representing that the received condition regarding the scanned document is fulfilled.

23. The printer according to claim 22,
wherein the controller is further configured to:
  receive the plurality of display conditions including a condition regarding a count of document sheets scanned to generate the scanned data;
  when the received condition regarding the count of the scanned document sheets is fulfilled, display on the display the at least one preview image based on the obtained image data; and
  prior to the preview screen being displayed on the display, display on the display the notification screen with information representing that the received condition regarding the count of the scanned document sheets is fulfilled.

24. The printer according to claim 17,
wherein the controller is further configured to:
  receive, via the user interface, a print parameter for a setting item for performing a printing process;
  obtain, as the image data, scanned data generated by scanning a document;
  receive the plurality of display conditions including a first condition that the received print parameter is a particular print parameter and a second condition regarding the document scanned to generate the scanned data; and
  when at least one of the first condition and the second condition is fulfilled, display on the display the at least one preview image based on the obtained image data.

25. The printer according to claim 24,
wherein the controller is further configured to:
  prior to the preview screen being displayed on the display, based on fulfillment of the first condition that the received print parameter is the particular print parameter, display on the display the notification screen with information representing that the first condition that the received print parameter is the particular print parameter is fulfilled; and
  prior to the preview screen being displayed on the display, based on fulfillment of the second condition regarding the scanned document, display on the display the notification screen with information representing that the second condition regarding the scanned document is fulfilled.

26. The printer according to claim 17,
wherein the controller comprises:
  a processor; and
  a non-transitory computer-readable medium storing computer-readable instructions configured to, when executed by the processor, cause the controller to:
    receive the plurality of display conditions via the user interface;
    store the information on the received plurality of display conditions in the memory;
    obtain the image data for the at least one page with the information on the plurality of display conditions stored in the memory;
    determine whether the plurality of display conditions indicated by the information stored in the memory are fulfilled based on the print settings for the obtained image data;
    when determining that at least one of the plurality of display conditions is fulfilled, display on the display the preview screen configured to display thereon the at least one preview image based on the obtained image data; and
    prior to the preview screen being displayed on the display, display on the display the notification screen to show the information about the one or more display conditions that are determined to be fulfilled among the plurality of display conditions.

27. The printer according to claim 1,
wherein the controller is further configured to:
  determine whether the print start condition indicated by the information stored in the memory includes a condition for individual-image printing to print one or more individual pages or a condition for all-image printing to print all of the plurality of pages;
  when determining that the print start condition indicated by the information stored in the memory includes the condition for the individual-image printing, perform printing of an individual page in response to determining that the print start condition is fulfilled when a feed button for displaying a next preview image is operated on the preview screen while a corresponding preview image is being displayed on the preview screen based on the image data for the individual page of the plurality of pages; and when determining that the print start condition includes the condition for the all-image printing, perform printing of all the plurality of pages, in response to determining that the print start condition is fulfilled when a print button for inputting a print instruction is operated on the preview screen while a final preview image is being displayed on the preview screen based on the image data for the final page of the plurality of pages.

28. The printer according to claim 8,
wherein the controller is further configured to:
   determine whether the print condition indicated by the information stored in the memory includes a condition for individual-image printing to print one or more individual pages or a condition for all-image printing to print all of the at least one page;
   when determining that the print condition indicated by the information stored in the memory includes the condition for the individual-image printing, perform printing of an individual page, in response to determining that the print condition is fulfilled when a feed button for displaying a next preview image is operated on the preview screen while a corresponding preview image is being displayed on the preview screen based on the image data for the individual page of the at least one page; and
   when determining that the print condition indicated by the information stored in the memory includes the condition for the all-image printing, perform printing of all the at least one page in response to determining that the print condition is fulfilled when a print button for inputting a print instruction is operated on the preview screen while a final preview image is being displayed on the preview screen based on the image data for the final page of the at least one page.

29. The printer according to claim 17,
wherein the plurality of display conditions includes:
   a first condition associated with a first upper threshold for a count of copies to be printed; and
   a second condition associated with a second upper threshold for a count of sheets to be printed, and
wherein the controller is further configured to:
   determine that the first condition is fulfilled when a setting value of the count of copies to be printed based on the obtained image data is more than the first upper threshold; and
   determine that the second condition is fulfilled when a setting value of the count of sheets to be printed based on the obtained image data is more than the second.

30. The printer according to claim 17,
wherein the controller is further configured to:
   when a particular operation is performed on the preview screen while the at least one preview image is being displayed on the preview screen, display a reconfiguration screen on the display, the reconfiguration screen being configured to accept reconfiguration of one or more print settings associated with the one or more display conditions that are determined to be fulfilled among the plurality of display conditions; and
   when accepting reconfiguration of the one or more print settings via the reconfiguration screen, perform printing based on the obtained image data in accordance with the reconfigured one or more print settings.

* * * * *